(12) United States Patent
Wakazono

(10) Patent No.: US 7,551,974 B2
(45) Date of Patent: Jun. 23, 2009

(54) PROCESSING METHOD OF WORKPIECES USING COMBINED PROCESSING MACHINES

(75) Inventor: Yoshio Wakazono, Nagoya (JP)

(73) Assignee: JTEKT Corporation, Osaka-shi (JP)

( * ) Notice: Subject to any disclaimer, the term of this patent is extended or adjusted under 35 U.S.C. 154(b) by 305 days.

(21) Appl. No.: 11/521,477

(22) Filed: Sep. 15, 2006

(65) Prior Publication Data

US 2008/0082201 A1 Apr. 3, 2008

(51) Int. Cl.
*G06F 19/00* (2006.01)

(52) U.S. Cl. ............... 700/96; 700/14; 700/99; 700/100; 700/108; 700/169; 700/173; 700/174; 700/179

(58) Field of Classification Search .......... 700/11, 700/14, 96, 99, 100, 103, 108, 169, 173, 700/174, 179; 705/7, 8, 28, 29
See application file for complete search history.

(56) References Cited

U.S. PATENT DOCUMENTS

| | | | |
|---|---|---|---|
| 4,459,458 A | 7/1984 | Vetsch et al. | |
| 5,447,613 A * | 9/1995 | Ouellet | 204/192.1 |
| 6,059,703 A | 5/2000 | Heisel et al. | |
| 6,198,980 B1 * | 3/2001 | Costanza | 700/99 |
| 6,241,437 B1 | 6/2001 | Wieland | |
| 6,428,453 B1 | 8/2002 | Hoppe et al. | |
| 7,280,880 B2 * | 10/2007 | Schmale | 700/97 |
| 2004/0082284 A1 | 4/2004 | Lutz et al. | |
| 2005/0135914 A1 | 6/2005 | Valasek et al. | |

FOREIGN PATENT DOCUMENTS

| | | |
|---|---|---|
| EP | 1 348 517 A2 | 10/2003 |
| JP | 5-8136 | 1/1993 |
| JP | 2002-160133 | 6/2002 |

OTHER PUBLICATIONS

U.S. Appl. No. 11/392,813, filed Mar. 30, 2006, Yoshio Wakazono.
U.S. Appl. No. 12/020,142, filed Jan. 25, 2008, Sugiyama, et al.
U.S. Appl. No. 11/751,819, filed May 22, 2007, Nagahama, et al.

* cited by examiner

*Primary Examiner*—Sean P Shechtman
(74) *Attorney, Agent, or Firm*—Oblon, Spivak, McClelland, Maier & Neustadt, P.C.

(57) ABSTRACT

Plural combined processing machines perform various processes to workpieces W. The combined processing machines are arranged in a processing line according to a volume of products of the workpieces, operating time of the combined processing machines and a tact time to complete processing one of the workpieces. Each combined processing machine is determined to share one or more processes according to the volume of the products, the operating time and the tact time. The workpieces are transferred among the combined processing machines to be processed.

3 Claims, 14 Drawing Sheets

PROCESSING METHOD OF WORKPIECES USING COMBINED PROCESSING MACHINES

BACKGROUND OF THE INVENTION

1. Field of the Invention

This invention relates to a processing method of plural workpieces using plural combined processing machines, wherein each combined processing machine selectively uses plural processing tools in order to variously process the workpieces, and wherein the combined processing machines process the workpieces efficiently.

2. Discussion of the Background

Among conventional machine tools, there are selected and used a turning machine, a drilling machine, a boring machine, a milling machine, a planing machine, a broaching machine, a grinding machine, etc. which are selected according to appropriateness for the process to be applied to a workpiece. Further, there is a combined processing machine which is numerically controlled (NC) in order to variously process the workpiece. For example, Japanese examined patent application publication JP-07-061585-B discloses one combined processing machine which lathes and grinds the workpiece. This prior art has plural turrets with plural tools and changes the turrets from/to a tool spindle head in order to process (e.g., lathe, mill, drill, grind and etc.) the workpiece with controlling the X, Y and Z axes.

A conventional flexible manufacturing system (FMS) has plural NC machine tools, an automatic workpiece transfer device which loads/unloads the workpiece into/from the machine tools, and a controller which controls the machine tools in the system in accordance with the process program corresponding to each workpiece. Japanese laid-open patent application publication JP-2000-280149-A discloses a processing method of the FMS. This prior art creates a heat treatment schedule according to an input order data and creates a pre-treatment schedule according to the heat treatment schedule. Therefore, the workpiece is processed by the pre-treatment equipment according to the pre-treatment schedule and is processed by the heat treatment equipment according to the heat treatment schedule.

Japanese laid-open patent application publication JP-07-148636-A discloses a flexible transfer line (FTL) which arranges plural machining centers and accounts for a fluctuation of a volume of processing the workpieces.

Most studies, however, have not focused on arranging plural machines for efficient processing (e.g., the combined processing machine of JP-07-061585-B, NC turning center, machining center, etc.) in order to process the workpiece form the beginning to the end according to the processing method (e.g. JP-2000-280149-A). Especially, the conventional FTL arranges plural machining centers which only perform cutting processes. Further, the conventional FTL is for a block-like workpiece (e.g. an engine cylinder block) fixed on a table to be cut.

SUMMARY OF THE INVENTION

In view of the foregoing, it is an object of the present invention to provide a processing method of plural workpieces in order to efficiently correspond to a fluctuation of a volume of processing the workpieces, wherein plural combined processing machines are arranged in a processing line.

In order to further the above and other objects, a processing method of plural workpieces comprises steps of arranging plural combined processing machines, determining a process share of each combined processing machine according to a volume of workpieces to be processed, and processing the workpieces according to the process share.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Figure 1:
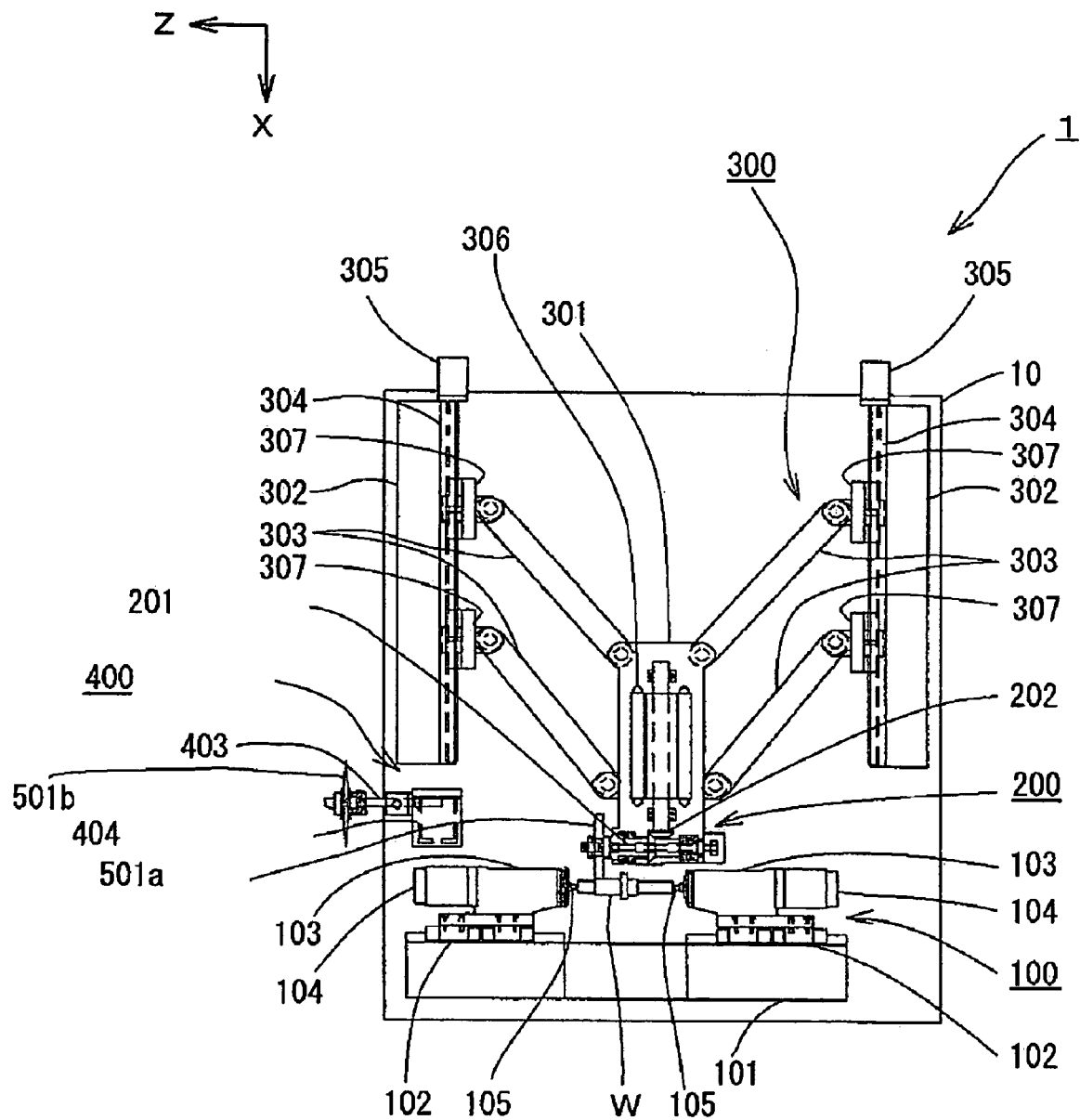
FIG. 1 is a plan view of an example of a combined processing machine used for the invention.

An example of a combined processing machine used for the present invention will be described with reference to figures. For convenience, an explanation of the machine will be done with reference to a view of an operator who would stand in front of the machine, i.e., at the bottom of FIG. 1. The X-axis is a first direction that extends from the back to the front of the machine in its depth direction, the Z-axis extends perpendicularly to the first direction from the right to the left of the machine in its width direction, and the Y-axis extends perpendicularly to the first and second directions from the bottom to the top of the machine in its height direction. In addition, FIGS. 1 to 5 show tools being changed from a first tool 501*a* to a second tool 501*b*, and FIGS. 6 to 10 respectively show processes of lathing with a lathing tool 502, of cutting with a cutting tool 503, of heat treatment with a heat treatment tool 504, of grinding with a grinding tool 505 and of surface finishing with a surface finishing tool 506 by changing the tools 502-506.

Figure 2:
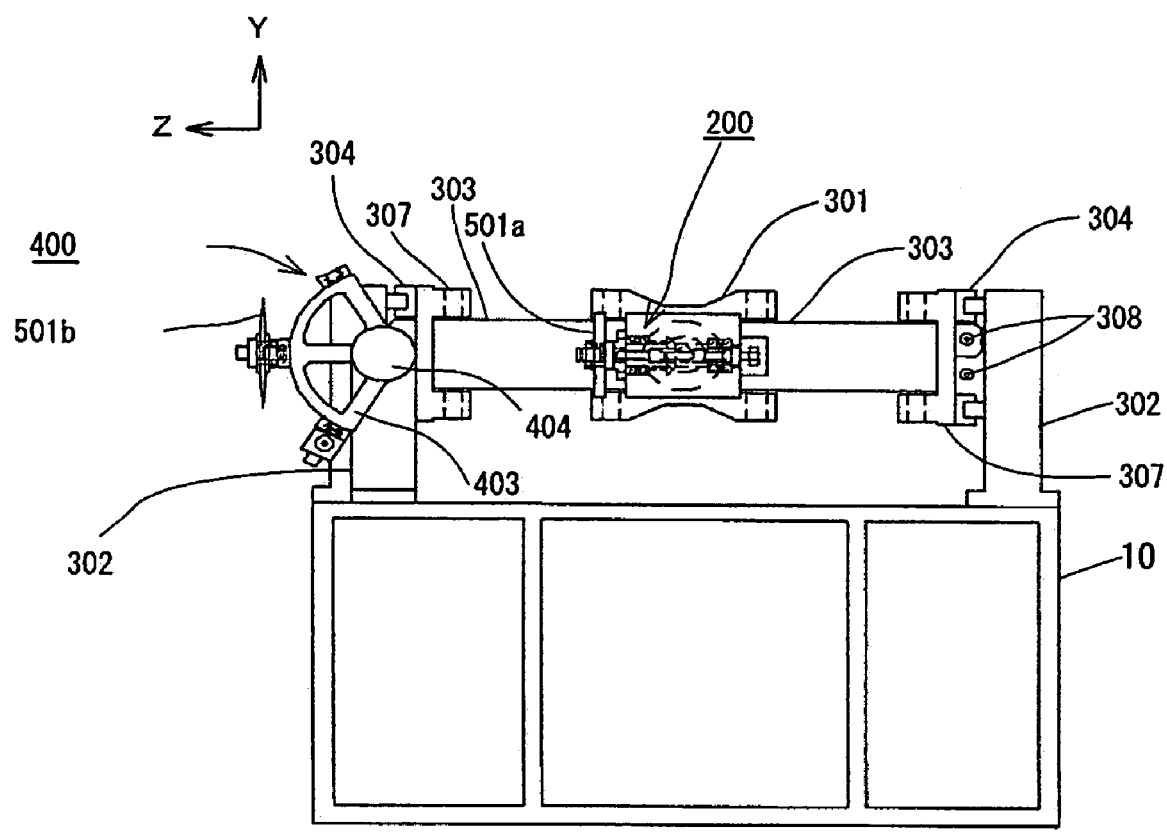
FIG. 2 is a front view of the embodiment as seen behind a head stock.
Figure 3:
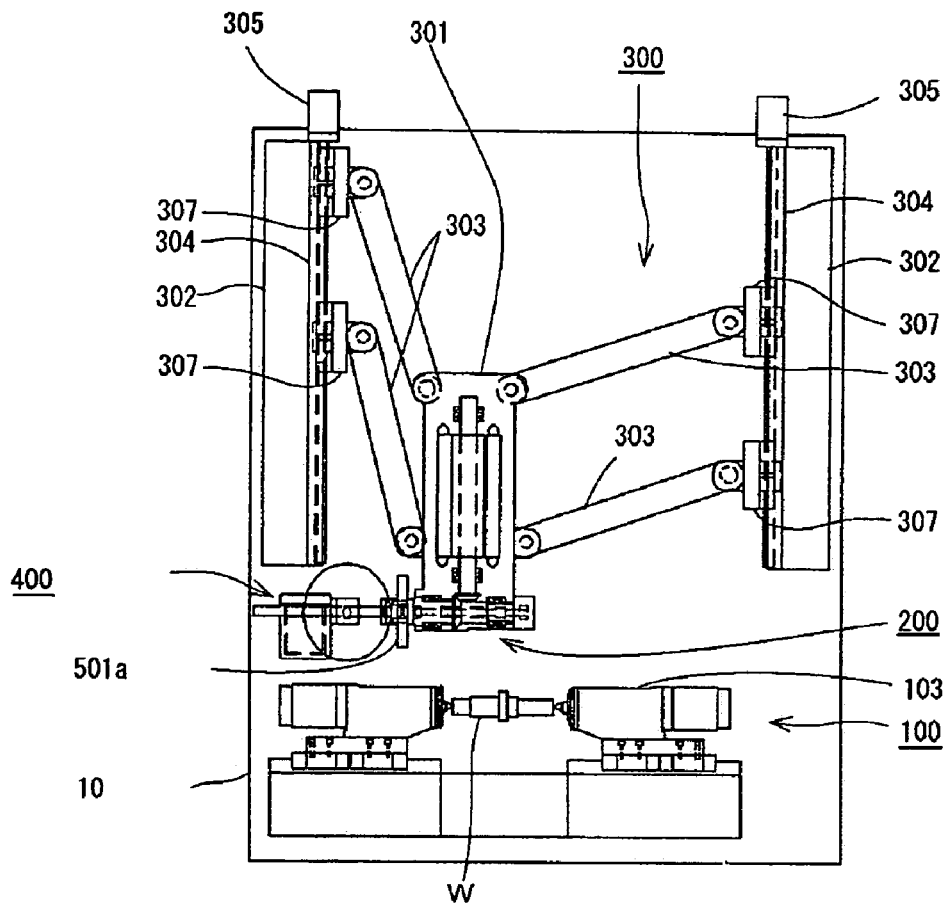
FIG. 3 shows plan and front views of the embodiment when tools are changed.
Figure 3:
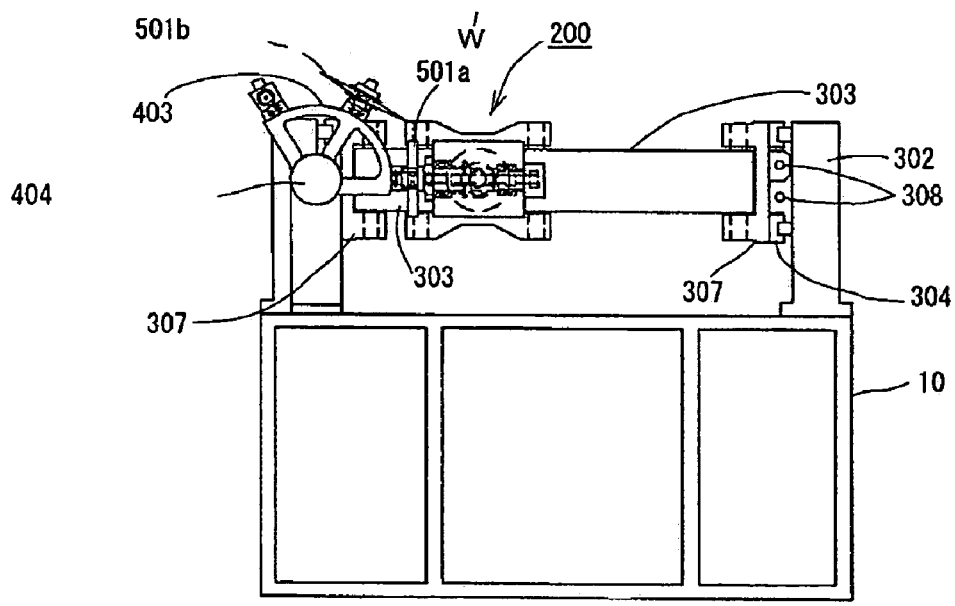
Figure 4:
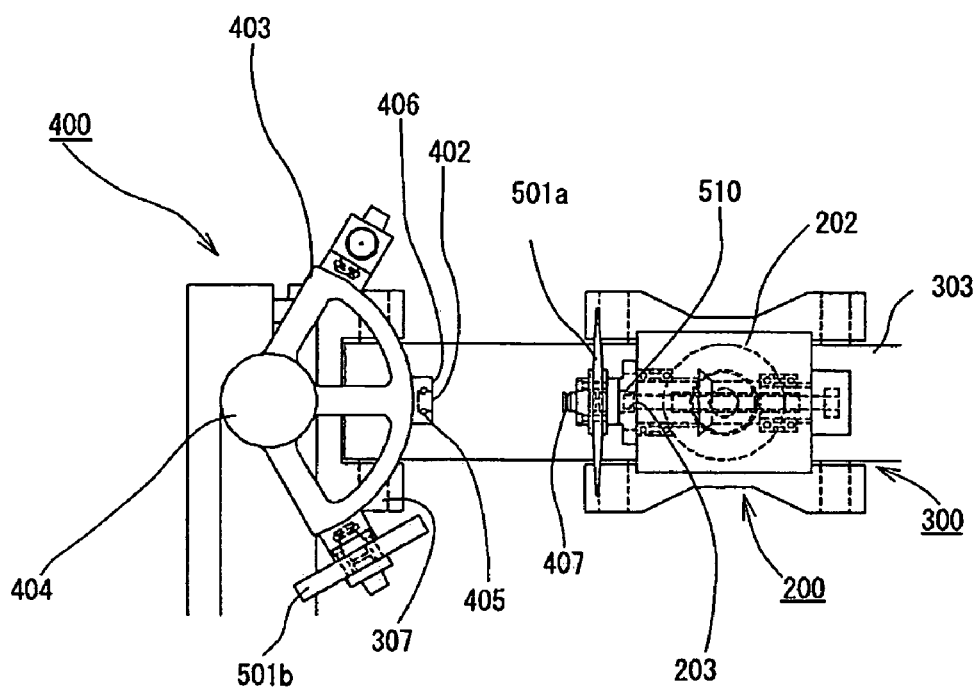
FIGS. 4(*a*)-4(*b*) show explanatory drawings of the embodiment when one of the tools is returned.
Figure 4:
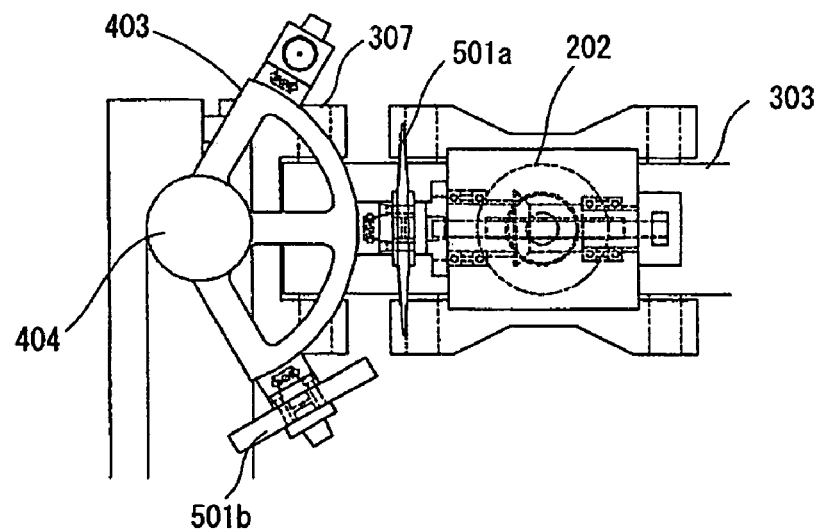
Figure 5A:
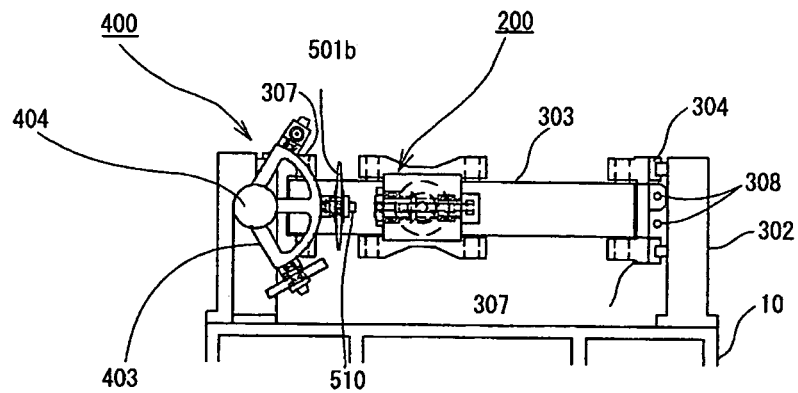
FIGS. 5(*a*)-5(*d*) show explanatory drawings of the embodiment when one of the tools is attached.
Figure 5B:
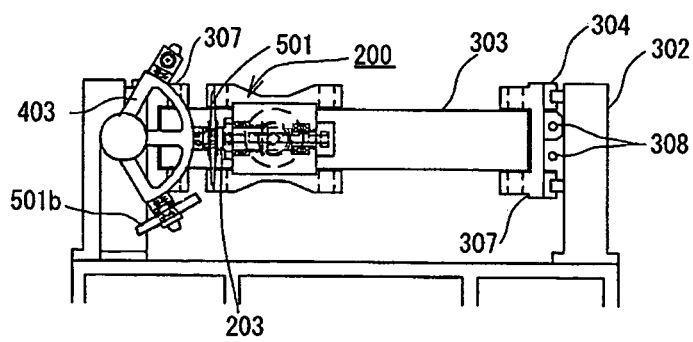
Figure 5C:
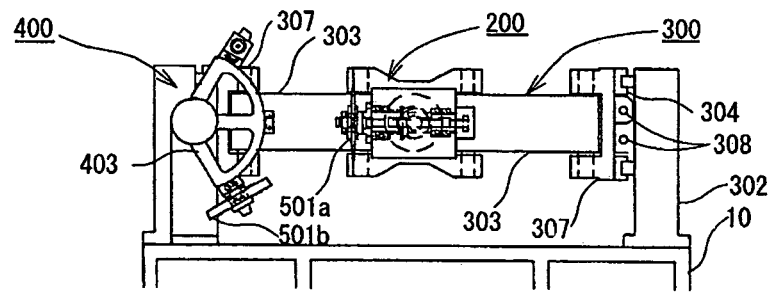
Figure 5D:
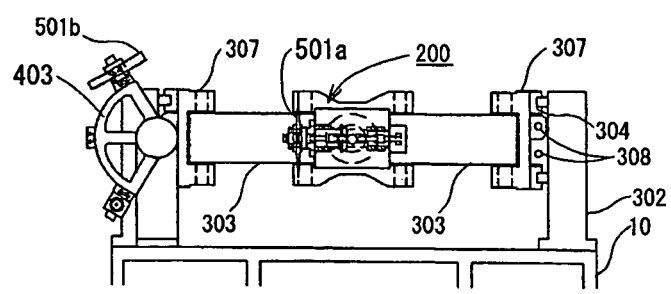

FIG. 1 shows a plan view of the combined processing machine 1 of the example and FIG. 2 shows a front view of the combined processing machine 1 behind a head stock 103. The combined processing machine 1 is controlled by a computer numerical controller (CNC). The combined processing machine 1 includes some attachments, e.g., a laser oscillator, an oil supplier, a cooling element, an air supplier, a coolant supplier, a chip collector and/or a duct. The CNC and the attachments are not shown.

The combined processing machine 1 comprises a bed 10, a workpiece supporter 100, a tool spindle unit 200 as a tool supporter and a linkage 300 with multi-degrees of freedom. The workpiece supporter 100 is mounted on the bed 10 and supports a shaft-like workpiece W rotatably and/or rigidly. The tool spindle unit 200 detachably supports the tools and is carried by the linkage 300 mounted on the bed 10. The linkage 300 comprises a link head 301 movable toward the workpiece W and an automatic tool changer 400 to store, serve and change the tools.

The workpiece supporter 100 has a headstock base 101 fixed on the bed 10, a pair of (right and left) headstocks 103 slidably mounted on the headstock base 101 via a pair of headstock slide guides 102, and a pair of headstock drive motors 104 respectively attached, to the headstocks 103 in order to drive main spindles 105 at a CNC-controlled rotational speed. The headstocks 103 slide independently on the Z-axis and support the workpiece W therebetween.

The tool spindle unit 200 attached to the link head 301 has a tool spindle 201, a tool spindle drive motor 306 and a traction drive unit 202. The tool spindle drive motor 306 rotates a first tool 501*a* supported by the tool spindle 201 at a CNC-controlled speed via the traction drive unit 202. Although the traction drive unit 202 is preferable because of its small vibration, it may be replaced by another drive train, e.g., a gear drive, a belt drive or a direct drive. The tool spindle 201 has a clamp portion 203 in order to strongly engage a taper portion 510 of the first tool 501*a* therewith. Preferably, the clamp portion 203 has compatibility with a tooling interface, e.g., by the HSK standard.

The linkage 300 with multi-degrees of freedom is a parallel mechanism having links arranged in parallel. The linkage 300 comprises a pair of (right and left) linear guide bases 302 mounted on the bed 10, four drive mechanisms arranged on the linear guide bases 302, and four pivotal links 303 connecting the drive mechanisms with the link head 301 carrying the tool spindle unit 200. The drive mechanisms have a pair of (right and left) linear guides 304, and a pair of sliders 307 slidably guided by the linear guides 304 along the X-axis respectively. The drive mechanisms further comprise four ball screws 308 and four link drive servo motors 305 in order to drive the sliders 307 independently. One end of each link 303 is pivotably connected with each slider 307, and the other end is pivotably connected with a predetermined point on the link head 301. Such an arrangement permits position and attitude-control of the link head 301 with three-degrees of freedom in the X, Y and Z-axes by independent control of the sliders 307 which are position-controlled by the link drive servo motors 305. The ball screws 308 and the link drive servo motors 305 may be replaced by linear motors driving the sliders 305 as drive mechanisms of the linkage 300 with multi-degrees of freedom.

Position sensors, not shown, are attached to the linear guides 304. Each position sensor, e.g., an optical linear scale or magnetic linear scale, detects the position of a slider 307. The use of the detected signal provides position and attitude feedback-control of the link head 301 for the positions in the X and Z-axes and the rotational angle about the Y-axis. Specific points of the link head 301 or the tool spindle unit 200 may instead be detected by optical, magnetic or electric sensors. In this case, there are detected two different specific points of the link head 301 or the tool spindle unit 200 in the X and Z-axes, so that the link head 301 is position and attitude-controlled.

The first tool 501*a* has a predetermined shape and is fixed at a predetermined position on the tool spindle unit 200. Thus, the control of the link head 301 provides position and attitude-control of the machining point of the first tool 501*a*. The first tool 501*a* is able to be position and attitude-controlled dependent on the shape of the workpiece W, machining point, machining angle, etc.

The automatic tool changer 400 is mounted at a predetermined point of the bed 10. The automatic tool changer 400 comprises a tool turret 403 having plural tool pods 402 to serve second tools 501*b* and a servo motor 404 to index the turret 403 about the X-axis. Each tool pod 402 has an engagement portion 406 with a ball bush 405 therein in order to receive a groove 407 formed around the tip of the first and second tools 501*a* and 501*b*. Thus, provided with a predetermined force or more, each of the tools 501*a* and 501*b* is attached/removed to/from the tool pods 402. Increasing the diameter of the tool turret 403 allows for more tool pods 402.

Plural kinds of tools are able to be used as the first and second tools 501*a* and 501*b*. For example, a lathing tool 502 (an electro plated wheel or the like) used for lathing, a cutting tool 503 (a drill used for boring or groove machining, an end mill or the like), a heat treatment tool 504 (a laser beam quenching head or the like), a grinding tool 505 (a CBN wheel or the like) used for grinding and a surface finishing tool 506 used for super finishing, ELID grinding or the like. Hereinafter, the lathing tool 502 and the cutting tool 503 are collectively called forming tools because these tools are used for forming the workpiece W. And the grinding tool 505 and the surface finishing tool 506 are collectively called finishing tools because these tools provide surface roughness finishing or accuracy of the workpiece W. Where the combined processing machine 1 requires a forming tool, a heat treatment tool and a finishing tool, one of the appropriate tools is selected for machining in a predetermined sequence by control of the tool spindle unit 200, the linkage 300 and the automatic tool changer 400.

As the lathing tool 502, there are applicable an electro plated wheel which is used with rotation, and a turning tool and a spring tool which are used without rotation. The electro plated wheel has chips of a cutting tool, diamond or CBN implanted in its circumferential surface by plating, e.g., nickel plating. The electro plated wheel has small tooling cost.

As the cutting tool 503, there are applicable a drill, a tap, an end mill and a milling cutter. In the neutral position, the rotational axis of the cutting tools 503 parallels the X-axis, but the rotational axis of the tool spindle drive motor 306 parallels the Z-axis. Thus, the rotation of the tool spindle 201 is converted via a bevel gear mechanism from the rotation of the tool spindle drive motor 306. Instead, a drive motor may be built in each cutting tool 503.

The heat treatment tool 504 (the laser beam quenching head or the like) irradiates a laser beam with high density energy. For example, a carbon dioxide laser or semiconductor laser is used for the heat treatment. The laser beam is supplied through a laser array or the like. The source of the laser beam may be arranged in the heat treatment tool 504. Instead, where the source is arranged outside of the heat treatment tool 504 (e.g., on the bed 10), the laser beam is collimated by a collimator and is condensed by a condenser lens which is position-controlled in the heat treatment tool 504 so that the condensed laser beam is supplied to the treatment point. While the heat treatment tool 504 is used, the tool spindle drive motor 306 does not rotate. The tool spindle unit 200 preferably has a brake to keep the tool spindle 201 from rotating. For example, the tool spindle drive motor 306 has large stationary torque, or the controller has large servo rigidity. For non-rotating tools like the heat treatment tool 504, the tool spindle unit 200 may have a tool attachment in order to fix the first or second tools 501a/501b.

The grinding tool 505 used for grinding has cubic boron nitride (CBN) grains so as to grind the workpiece W precisely. The surface finishing tool 506 preferably includes an ultrasonic generator which makes the surface finishing tool 506 vibrate in order to obtain a smooth surface. For the ELID grinding, the surface finishing tool 506 is preferably made from a grinding wheel which has diamond grains bonded to each other by a cast binder, and there is preferably provided an electrolyte supplier.

[Automatic Tool Change]

FIGS. 3(a)-3(b) show a positional relationship between the tool spindle unit 200 and the automatic tool changer 400 while exchanging the first tool 501a for the second tool 501b. FIGS. 4(a)-4(b) show the first tool 501a being removed from the tool spindle unit 200 and attached to the tool turret 403. FIGS. 5(a)-5(d) show the second tool 501b being attached to the tool spindle unit 200.

The linkage with multi-degrees of freedom 300 transfers the tool spindle unit 200 to the predetermined position where the first tool 501a is able to be removed. The predetermined position is decided by the positional relationship between the groove 407 formed around the tip of the first tools 501a and the engagement portion 406 with a ball bush 405 in the tool pod 402. Each tool has its own predetermined position for the tool change so that each tool change position is stored in the controller.

FIGS. 4(a)-4(b) are explanatory drawings that show how to return the first tool 501a to the tool turret 403. Before the next process (cutting, grinding, heat treatment or etc.), the first tool 501a is returned from the tool spindle unit 200 to the tool turret 403. The linkage 300 transfers the tool spindle unit 200 to the predetermined point (FIG. 4(a)) and then inserts the tip of the first tool 501a into the engagement portion 406 with the predetermined force or more (FIG. 4(b)). Next, the ball bush 405 of the engagement portion 406 holds the groove 407 formed at the tip of the first tool 501a with the predetermined force. Then, the clamp portion 203 of the tool spindle unit 200 releases the taper portion 510. Finally, the tool spindle unit 200 is moved away from the automatic tool changer 400 by the linkage 300.

FIGS. 5(a)-5(d) are explanatory drawings that show how to set the second tool 501b to the tool spindle unit 200. The tool spindle unit 200 stays where it has been moved away from the automatic tool changer 400. The servo motor 404 indexes one of the tool pods 402 of the tool turret 403 which serves the second tool 501b (FIG. 5(a)). Next, the tool spindle unit 200 approaches the second tool 501b, and then the taper portion 510 of the second tool 501b is clamped by the clamp portion 203 of the tool spindle unit 200. Where the clamp portion 203 is formed by the tooling interface of the HSK standard for machining centers, the second tool 501b is strongly engaged with the tool spindle unit 200 by double fit of the taper portion 510 and the end face of the second tool 501b (FIG. 5(b)). After clamping, the tool spindle unit 200 is moved away from the automatic tool changer 400 to an initial position for the next process by the linkage 300 (FIG. 5(c)). Then, the tool turret 403 rotates and returns to an idle position, whereby the tool change operation is completed (FIG. 5(d)).

Hereinafter, there will be described processes by using of the lathing tool 502, the cutting tool 503, the heat treatment tool 504, the grinding tool 505 and the surface finishing tool 506. Thus there will not be used the general terms of the first tool 501a and the second tool 501b.

[Lathing]

Figure 6A:
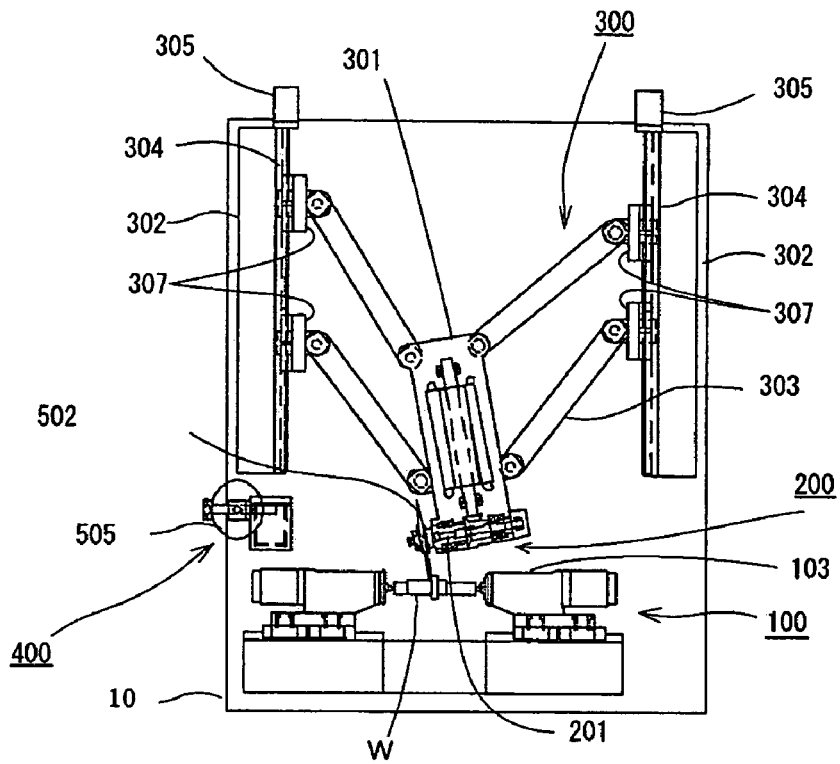
FIGS. 6(*a*)-6(*b*) show a lathing process of the embodiment.
Figure 6B:
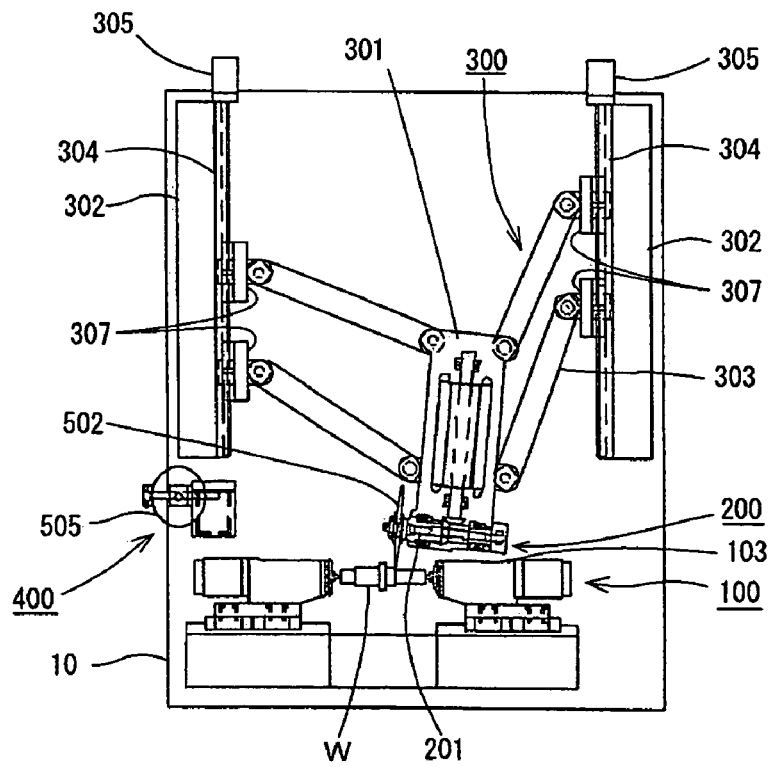

FIGS. 6(a)-6(b) show the lathing process of the workpiece W by using the lathing tool 502 of the electro plated wheel attached to the tool spindle unit 200. Where the electro plated wheel is rotated at high speed by the tool spindle unit 200 and lathes the workpiece W, the tool wear ratio becomes 1/10 or less and the tool cost becomes approximately one half that of the conventional lathing tool. When lathing the face of the workpiece W, the lathing tool 502 is revolved about the Y-axis by the linkage 300. As shown in FIGS. 6(a)-6(b), both right and left side faces of the workpiece W are lathed by revolving the lathing tool 502. Besides, the lathing tool 502 is able to be appropriately position and attitude-controlled for lathing by the linkage 300.

[Heat Treatment]

Figure 7:
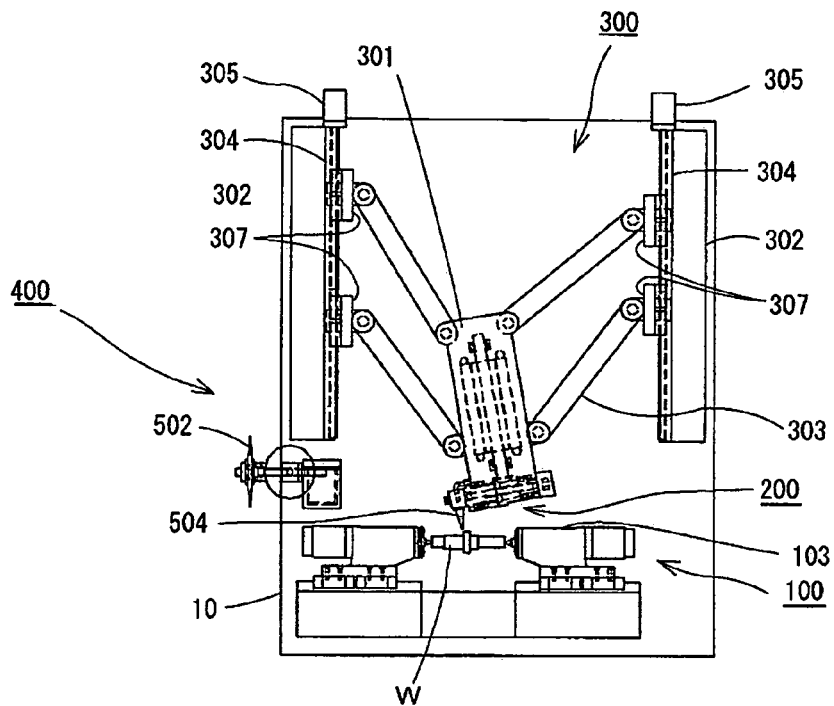
FIG. 7 shows a heat treatment process of the embodiment.

FIG. 7 shows the heat treatment process of the workpiece W by using the heat treatment tool 504 of the laser beam quenching head attached to the tool spindle unit 200. Where laser beam quenching is required, the surface of the workpiece W is irradiated by the laser beam with high density energy. A small circle of a laser beam spot on the surface of the workpiece W heats and quenches the surface of the workpiece W around the laser beam spot. Because the laser beam spot is moved relative to the workpiece W by the rotation of the workpiece W, the heated area is rapidly cooled down and is completely tempered without an additional tempering process. By being moved along the Z-axis by the linkage 300, the heat treatment tool 504 is longitudinally able to generally quench the workpiece W. Where the heat condition of the laser beam is changed, a variety of heat treatment, e.g., tempering, is able to take place. In the case that the workpiece W is a resin, a variety of heat treatments, e.g., refining the surface of the workpiece W, are able to be done by irradiating with a shortwave laser beam. Where the heat treatment tool 504 is used, the tool spindle 201 of the tool spindle unit 200 does not rotate.

[Boring, Groove Machining]

Figure 8:
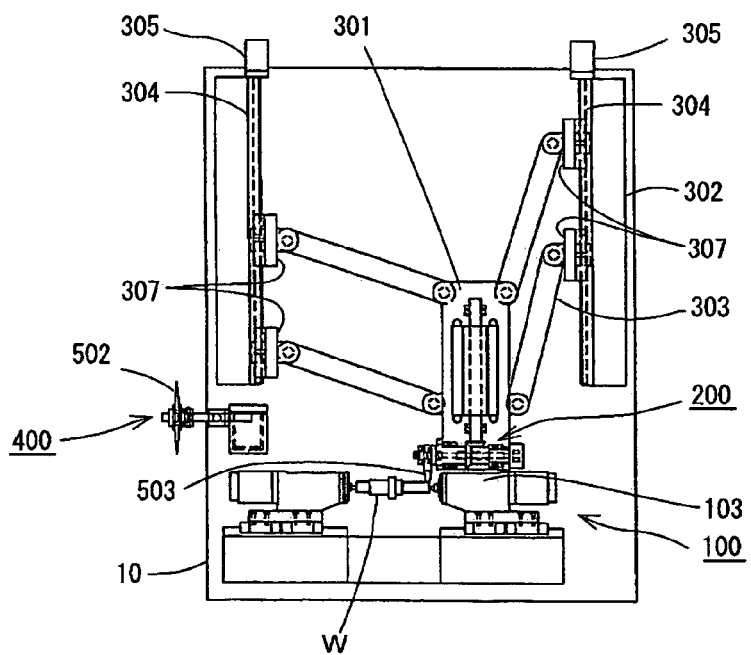
FIG. 8 shows a cutting process of the embodiment.

FIG. 8 shows the boring or groove machining process of the workpiece W by using the cutting tool 503 attached to the tool spindle unit 200. In the boring process, the drill as the cutting tool 503 is attached to the tool spindle unit 200. The drill is driven by the tool spindle drive motor 306 or a separate motor and bores the workpiece W which is not rotated. In the groove machining process, the end mill as the cutting tool 501 is attached to the tool spindle unit 200. The end mill advances to the workpiece W and moves in the direction of the groove machining.

[Grinding]

Figure 9:
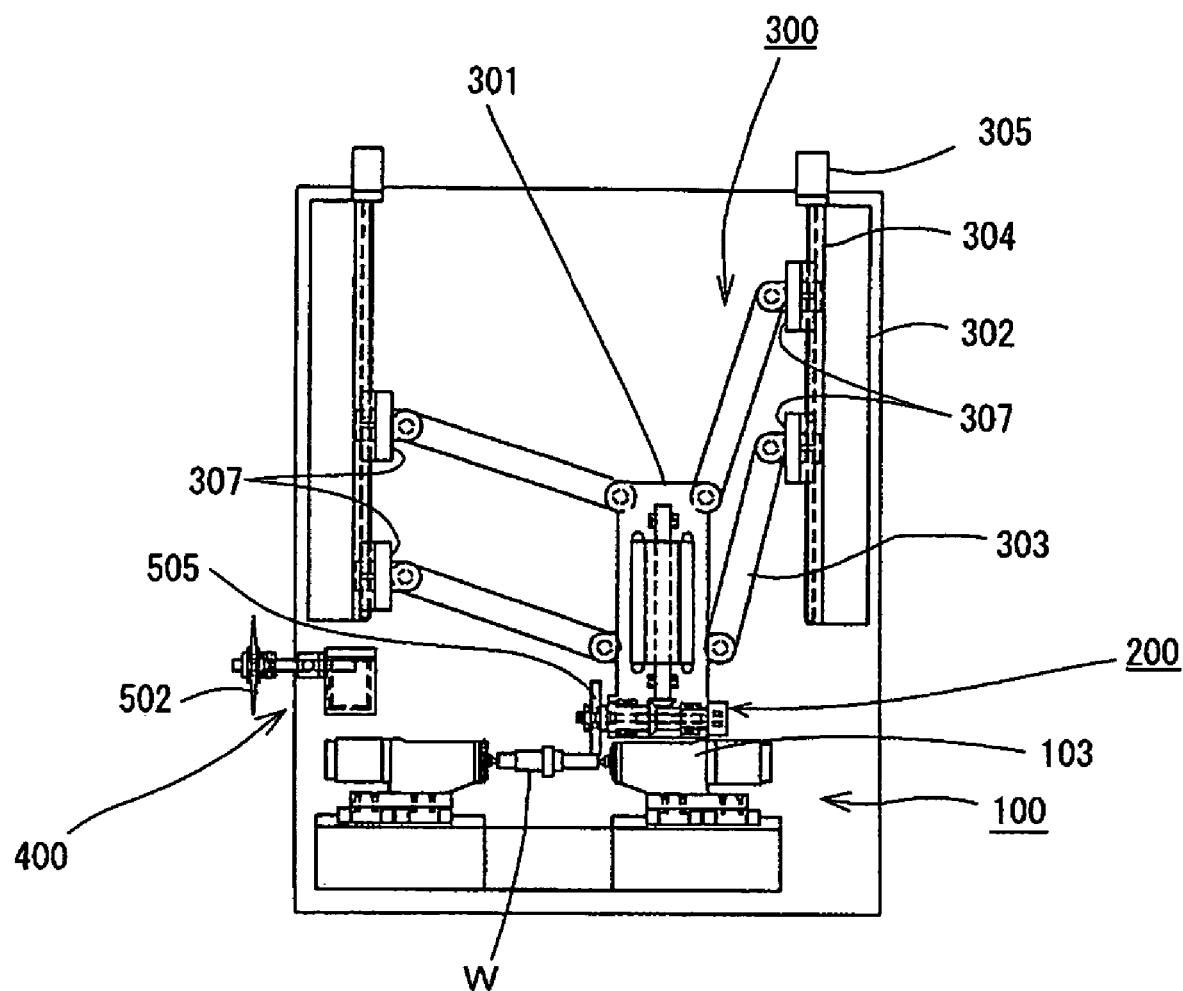
FIG. 9 shows a grinding process of the embodiment.

FIG. 9 shows the grinding process of the workpiece W by using a grinding wheel, e.g., a CBN wheel, as the grinding tool 505 attached to the tool spindle unit 200. In the grinding process, as shown in FIG. 9, the grinding wheel contacts the workpiece W perpendicularly. Similar to the lathing process shown in FIG. 6, an angular grinding is able to be performed. Because the linkage 300 has multi-degrees of freedom, the grinding tool 505 is able to revolve, advance and retract to the workpiece W with an appropriate position and attitude. Therefore, appropriate grinding takes place with the grinding tool 505. For example, gradient and various composite grinding tools would be applicable.

[Surface Finishing]

The surface finishing process of the workpiece W is performed by the surface finishing tool 506 attached to the tool spindle unit 200. For example, super finishing may be performed with vibrating of a grinding tool, ELID grinding with dressing in the electrolyte, lapping, polishing or buffing.

[Example of Conventional Process]

Figure 10:
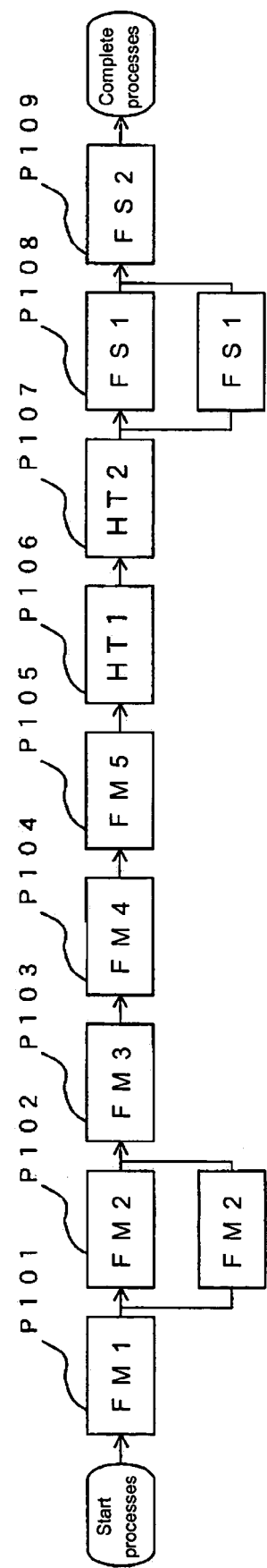
FIG. 10 shows an example of a conventional processing line of constant velocity joints.

FIG. 10 shows an example of a conventional processing line for constant velocity joints, one of typical automotive parts. In sequential processes, a center hole (FM1) P101 is first made. Where the center hole has already been made in a deformation process of a blank of the workpiece W, the center hole process (FM1) P101 is omitted. Next, the workpiece W is formed into nearly a final product shape except for a finishing allowance, by lathing (FM2) P102. The lathing process (FM2) P102 requires so much time to be done that plural turning machines may be arranged in the processing line in order to perform the work simultaneously. Another lathing process is chamfering (FM3) P103. But in the case that the chamfer has already been made in the deformation process of the blank of the workpiece W, the chamfer process (FM3) P103 is omitted. Next, a bore is made in a boring process (FM4) P104 and grooves are made in a spline process (FM5) P105. After such forming processes, heat treatment processes, a quenching (HT1) P106 and a tempering (HT2) P107, are done. Next, the grinding process (FS1) P108 is done in order to finish the surface of the workpiece W in a permissible dimensional tolerance. The grinding process (FS1) P108 requires so much time to be done that plural grinding machines may be arranged in the processing line in order to perform the work simultaneously. Finally, a hard turning (FS2) P109 is done by lathing an internal surface of the workpiece W. The sequential processes are then finished.

First Embodiment

Figure 11:
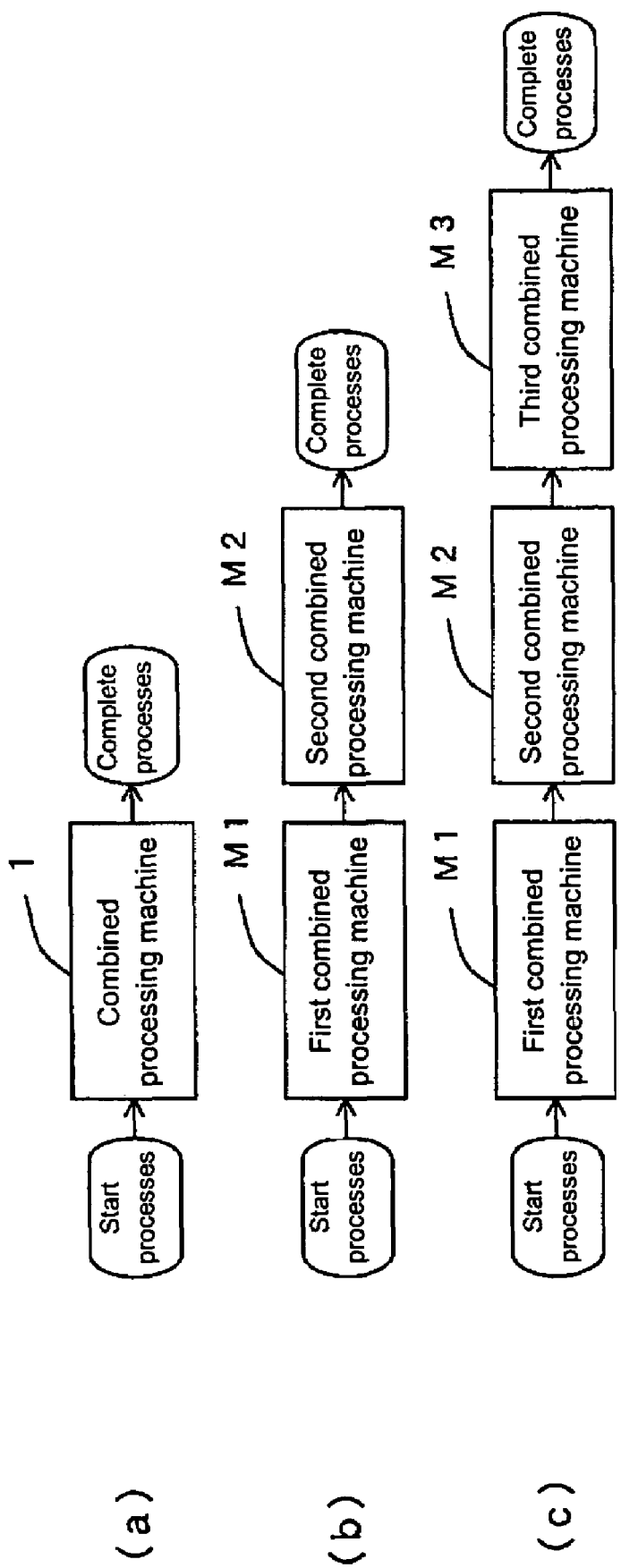
FIGS. 11(*a*)-11(*c*) show explanatory drawings of a processing method of a first embodiment.

A first embodiment of the invention will be described with reference to FIGS. 11(a)-11(c). FIGS. 11(a)-11(c) are explanatory drawings where one to three combined processing machine(s) 1 respectively complete(s) processing the workpieces W in the sequential processes, assuming each sum of the processed workpieces W is "n" in each operation time "S". The processing line performs the center hole process (FM1) P101, the lathing process (FM2) P102, the chamfer process (FM3) P103, the boring process (FM4) P104, the spline process (FM5) P105, the quenching process (HT1) P106, the tempering process (HT2) P107, the grinding process (FS1) P108 and the finishing process (FS2) P109 shown in FIG. 10.

Forming processes FM1-FM5 are done by the forming tools. TFM1-TFM5 respectively indicate processing times of the forming processes FM1-FM5. Similarly, THT1-THT2 indicate processing times of heat treatment processes HT1-HT2 with the heat treatment tools and TFS1-TFS2 indicate processing times of finishing processes FS1-FS2 with the finishing tools. A time for completing one workpiece W to be processed, namely a tact time of the processing line, is "S/n", where "S" is the total processing time in seconds for a single kind of product and "n" is the number of products to be produced, thereby one completed workpiece W is produced in every S/n. The below calculation (1) determines the number of needed combined processing machines "N" (N is an integer) in the processing line for accomplishing a schedule of the production.

$$N \geq \frac{TFM1 + TFM2 + TFM3 + TFM4 + TFM5 + THT1 + THT2 + TFS1 + TFS2}{S/n} \quad (1)$$

The first combined processing machine M1 has a share of the processes to which the sum of the processing times (TFM1+TFM2+ . . . ) reaches S/n from the process FM1 (P101). The second combined processing machine M2 has a share of the processes to which the sum of the processing times reaches S/n from the next process of the first combined processing machine M1. Similarly, Nth combined processing machine MN has a share of the processes whose sum of the processing times reaches S/n from the next process of the (N−1)th combined processing machine M(N−1) to the finishing process FS2 (P109). Each sum of the processing times is chosen from the value which is the closest to the tact time S/n.

Next, examples of the first embodiment will be described. Although omitting explanations, each processing time includes an actual processing time, an index time, a tool change time, a workpiece loading/unloading time and etc. The examples will be explained below, assuming the operation time of a day is 8 hours (28,800 seconds) and the processing times TFM1-TFS2 are 10 seconds, 20 seconds, 20 seconds, 10 seconds, 30 seconds, 30 seconds, 10 seconds, 20 seconds and 30 seconds respectively (TFM1=10 seconds, TFM2=20 seconds, TFM3=20 seconds, TFM4=10 seconds, TFM5=30 seconds, THT1=30 seconds, THT2=10 seconds, TFS1=20 seconds and TFS2=30 seconds), 180 seconds in total.

In the case the number of the products is 150 (n=150), the tact time S/n is 192 seconds (28,800/150=192) and the right side of the calculation (1) is 0.94 (180/192=0.94). Thus the number of required combined processing machines N is one which is the closest integer larger than 0.94. In this case, one combined processing machine completes all processes so that the sharing of the processes is unnecessary, see FIG. 11(a).

In the case the number of the products is 300 (n=300), the tact time S/n is 96 seconds (28,800/300=96) and the right side of the calculation (1) is 1.875 (180/96=1.875). Thus the number of required combined processing machines N is two which is the closest integer larger than 1.875. In this case, the first combined processing machine M1 has the share of the processes from FM1 (P101) to FM5 (P105) whose processing times are 90 seconds (10+20+20+10+30=90), and the second combined processing machine M2 has the share of the processes from HT1 (P106) to FS2 (P109) whose processing times are 90 seconds (30+10+20+30=90), see FIG. 11(b).

In the case the number of the products is 450 (n=450), the tact time S/n is 64 seconds (28,800/450=64) and the right side of the calculation (1) is 2.81 (180/64=2.81). Thus the number of required combined processing machines N is three which is the closest integer larger than 2.81. In this case, the first combined processing machine M1 has the share of the processes from FM1 (P101) to FM4 (P104) whose processing times are 60 seconds (10+20+20+10=60), the second combined processing machine M2 has the share of the processes from FM5 (P105) to HT1 (P106) whose processing times are 60 seconds (30+30=30), and the third combined processing machine M3 has the share of the processes from HT2 (P107) to FS2 (P109) whose processing times are 60 seconds (10+20+30=30), see FIG. 11(c).

In the first embodiment, the number of required combined processing machines N is determined according to the volume of the produced workpieces W, the operation time of the combined processing machines and the total processing times per one workpiece W (tact time). Each required combined processing machine is arranged in the processing line and shares the processes in order to minimize the idle time of each combined processing machine, thereby the workpieces W are processed efficiently.

Second Embodiment

Figure 12:
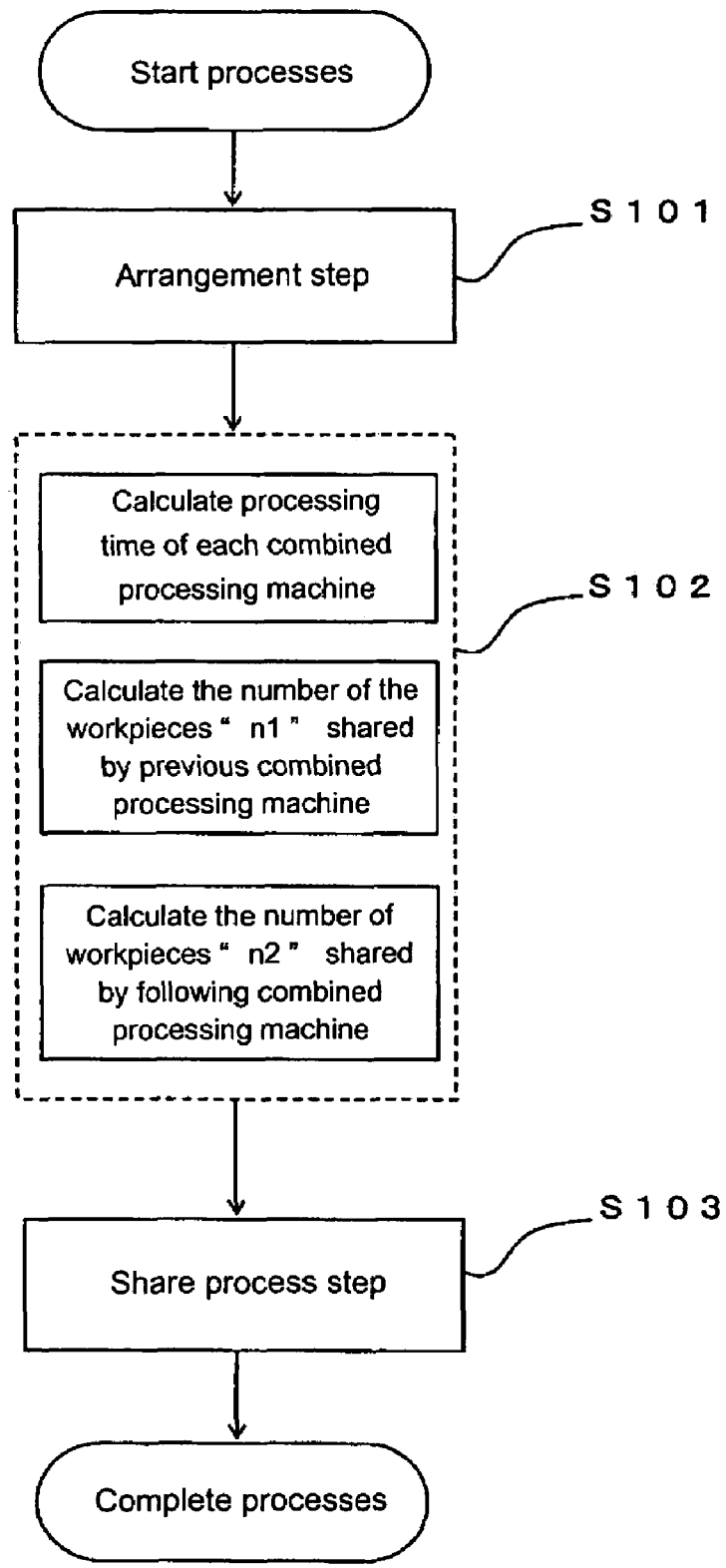
FIG. 12 shows a flow chart of a processing method of a second embodiment.
Figure 13:
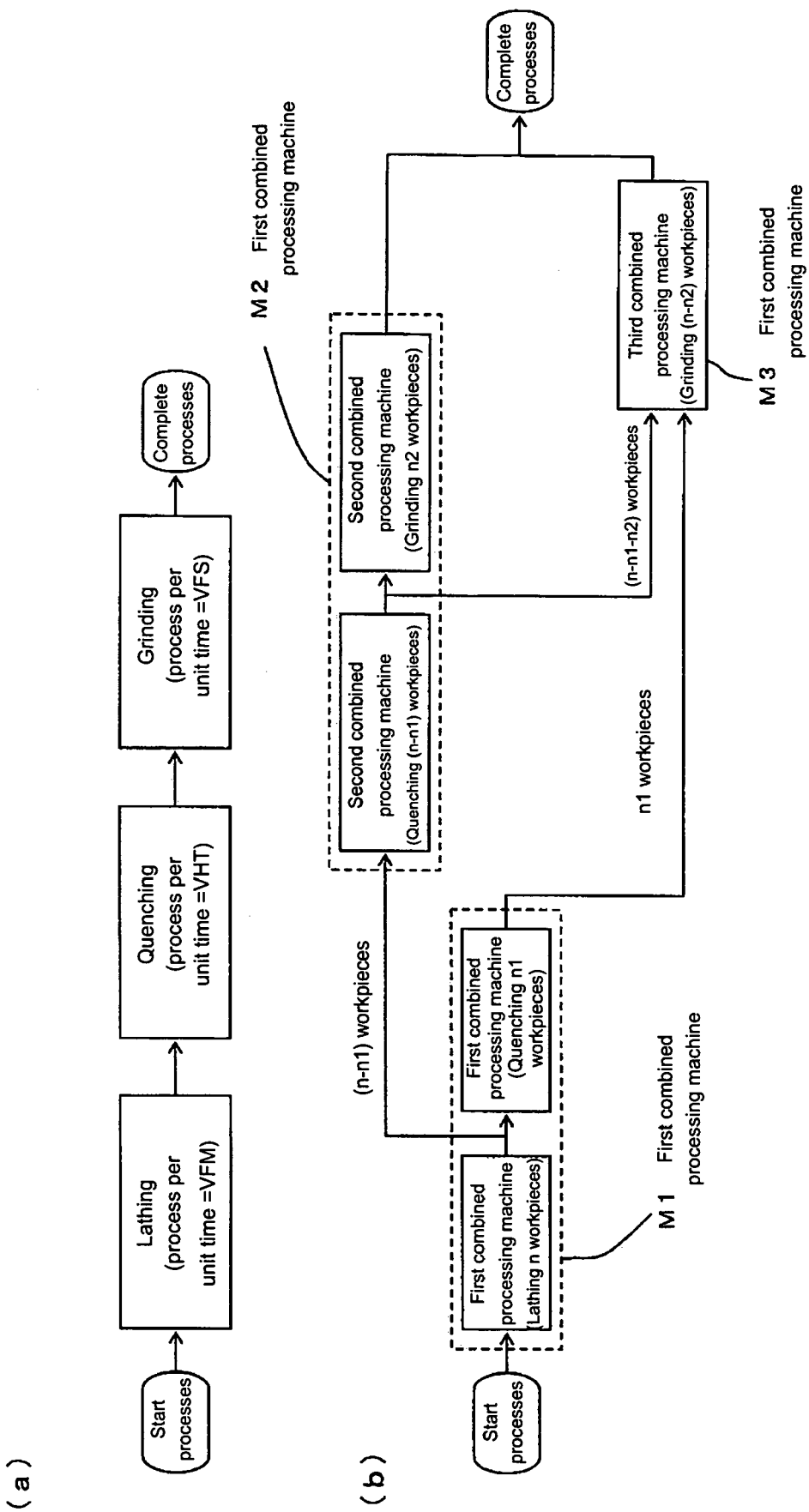
FIGS. 13(*a*)-13(*b*) show explanatory drawings of a processing method of the second embodiment.

A second embodiment of the invention will be described with reference to FIGS. 12, 13(a) and 13(b). In the second embodiment, intensive processes are done by the combined processing machines which lathe, quench and grind the workpieces W in main processes of the constant velocity joints. FIG. 12 shows a flowchart of steps of a processing method of the second embodiment. FIGS. 13(a)-13(b) show flowcharts of processes of the processing line of the second embodiment, wherein FIG. 13(a) is a flowchart of sequential processes and FIG. 13(b) is a flowchart showing how to share the sequential processes in the intensive processes depending on the number of the workpieces "n". Each processing time includes the actual processing time, the index time, the tool change time, the workpiece loading/unloading time and etc. Omitted is the time for transferring the workpiece W form one machine to another machine, because the workpiece transferring time is much shorter than the tool change time or etc. in general.

[Arrangement Step]

First in the processing method of FIG. 12, it is determined how to arrange plural combined processing machines 1. Consideration of the volume of the products determines the number of the combined processing machines N to be arranged in the processing line (arrangement step S101). In the arrangement step S101, plural combined processing machines are arranged so as to load/unload the workpieces W into/from each combined processing machine depending on the sequential processes. It is preferable that the arrangement is determined by paths transferring the workpieces W. The maximum number of the arranged combined processing machines is determined by a floor space in a plant, a cost of the processing line and etc.

[Process Share Determination Step]

A share of the processes of each combined processing machine is determined according to the number of the combined processing machines N determined in the arrangement step. Assuming "n" is the number of the products in the processing line and assuming VFM, VHT and VFS are the number of completed lathing, quenching and grinding processes per unit time respectively (FIG. 13(a)), the processes respectively require processing times of n/VFM in the lathing process, n/VHT in the quenching process and n/VFS in the grinding process for completing "n" workpieces. The processing times are shared out among the combined processing machines in the processing line. If the processing time of one combined processing machine is longer than the other machines, the other machines have idle times. That is, a critical path is related to the machine having the longer processing time, and thus the critical path affects the entire processing line so as to reduce the production efficiency. Therefore it is preferable to determine the operating time of each combined processing machine to be substantially equal.

For equal operating times of each combined processing machine, it is determined what kind of and how many processes are shared by each combined processing machine. As an example, three identical combined processing machines are arranged in the processing line, assuming n/VFM is smaller than n/VHT that is smaller than n/VFS (n/VFM<n/VHT<n/VFM). Namely, the finishing process is longer than the quenching process that is longer than the lathing process. In this case, to the first combined processing machine M1 is distributed the lathing process for all workpieces and the quenching process for a part of the workpieces. To the second combined processing machine M2 is distributed the quenching process for another part of the workpieces and the grinding process for a part of the workpieces. To the third combined processing machine M3 is distributed the grinding process of another part of the workpieces.

Assuming n1 is the number of the quenched workpieces by the first combined processing machine M1; the first combined processing machine M1 lathes n workpieces and quenches n1 workpieces. Further assuming n2 is the number of the ground workpieces by the second combined processing machine M2, the second combined processing machine M2 quenches (n−n1) workpieces and grinds n2 workpieces. The third combined processing machine M3 grinds (n−n2) workpieces. Therefore, the operating time of the first combined processing machine M1 is n/VFM+n1/VHT, the operating time of the second combined processing machine M2 is (n−n1)/VHT+n2/VFS, and the operating time of the third combined processing machine M3 is (n−n2)/VFS. Where the below two equations (2) and (3) are satisfied, the operating times of three machines become equal.

$$n/VFM+n1/VHT=(n-n1)/VHT+n2/VFS \quad (2)$$

$$n/VFM+n1/VHT=(n-n2)/VFS \quad (3)$$

Combining equations (2) and (3) gives the number of quenching operations n1 on the first machine M1 and the number of grinding operations n2 on the second machine M2.

$$n1=n\times VHT(1/VFS+1/VHT-2/VFM)/3 \quad (4)$$

$$n2=n\times VFS(2/VFS-1/VHT-1/VFM)/3 \quad (5)$$

Therefore, the first combined processing machine M1 is determined to have a share of quenching n1 workpieces so as to help the second combined processing machine M2, and the second combined processing machine M2 is determined to have a share of grinding n2 workpieces so as to help the third combined processing machine M3 (share determination step S102 of FIG. 12).

[Share Process Step]

According to the result of the share determination step S102, the first combined processing machine M1 laths n workpieces and quenches n1 workpieces, the second combined processing machine M2 quenches (n−n1) workpieces and grinds n2 workpieces, and the third combined processing machine M3 grinds (n−n2) workpieces, as shown in FIG. 13(b).

Attaching the lathing tool 502 to the tool spindle unit 200, the first combined processing machine M1 rotates the workpiece W and the lathing tool 502 so as to lathe the workpiece W. The rotational speed of the lathing tool 502 is adjusted to the rotational speed and material of the workpiece W. The first combined processing machine M1 lathes n workpieces W continuously, and then removes the lathing tool 502 to the tool turret 403 and attaches the heat treatment tool 504 to the tool spindle unit 200 for the following quenching process. Next, the first combined processing machine M1 quenches n1 workpieces W with the heat treatment tool 504. These n1 workpieces W have been lathed and quenched by the first combined processing machine M1, and then are transferred to the third combined processing machine M3. The other (n−n1) workpieces W are quenched not by the first combined processing machine M1 but by the second combined processing machine M2 so as to be transferred to the second combined processing machine M2. The processed workpieces W by the first machine M1 are transferred to the second or third machine M2 or M3 to avoid idle time in the next process.

The second combined processing machine M2 first attaches the heat treatment tool 504 to the tool spindle unit 200 in order to quench the workpieces W transferred from the first combined processing machine M1. The second combined processing machine M2 quenches (n–n1) workpieces W with the heat treatment tool 504 continuously, and then removes the heat treatment tool 504 to the tool turret and attaches the grinding tool 505 to the tool spindle unit 200 for the following grinding process. The second combined processing machine M2 rotates the workpiece W and the grinding tool 505 so as to grind the workpiece W. The rotational speed of the grinding tool 505 is adjusted to the rotational speed and material of the workpiece W. The second combined processing machine M2 grinds n2 of quenched (n–n1) workpieces W. The other (n–n1–n2) workpieces W, only quenched by the second combined processing machine M2, are transferred to the third combined processing machine M3. The quenched workpieces W by the second combined processing machine M2 are transferred to the third combined processing machine M3 to avoid idle time in the next process. All the processes are done for n2 workpieces W quenched and ground by the second combined processing machine M2.

The third combined processing machine M3 attaches the grinding tool 505 to the tool spindle unit 200 in order to grind the workpieces W. The third combined processing machine M3 rotates the workpiece W and the grinding tool 505 so as to grind the workpiece W. The rotational speed of the grinding tool 505 is adjusted to the rotational speed and material of the workpiece W. The third combined processing machine M3 grinds (n–n2) workpieces W (n1 workpieces W transferred from the first machine M1 and (n–n1–n2) workpieces W transferred from the second machine M2).

At almost the same time, the second and third combined processing machines M2 and M3 complete the grinding processes so as to complete all processes (share process step S103 of FIG. 12).

Although the processing line includes three combined processing machines in the second embodiment, the arrangement of the processing line is capable of more or fewer combined processing machines because the share determination step S101 determines what kind of processes would be distributed to each machine and how many workpieces each machine would process. Thus each machine has minimum idle time and the processing line works efficiently. Where the number of the combined processing machines increases or a difference in the amount of each process per unit time is large, the process share determination step S101 may cause each combined processing machine to share the processes which would be done by one or more of the previous or following machines. Further, the share determination step S101 may consider the workpiece transferring time.

According to the second embodiment, the plural combined processing machines are preferably arranged in the processing line and the processed workpiece by one machine is transferred to the next machine, whereby each machine has minimum idle time and the processing line works efficiently.

Third Embodiment

Figure 14:
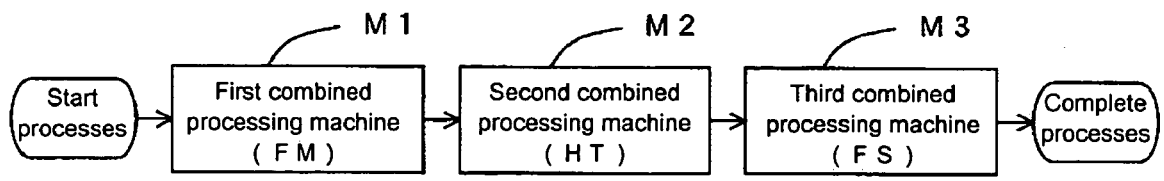
FIG. 14 shows an explanatory drawing of a processing method of a third embodiment.

FIG. 14 shows a third embodiment whose processing line includes three combined processing machines M1-M3 sharing the lathing, quenching and grinding processes. Where the processing times of the lathing, quenching and grinding processes are almost the same, the three processes are respectively shared among the three machines. Namely, the lathing process FM is distributed to the first combined processing machine M1, the quenching process HT is distributed to the second combined processing machine M2 and the grinding process FS is distributed to the third combined processing machine M3.

Fourth Embodiment

Figure 15:
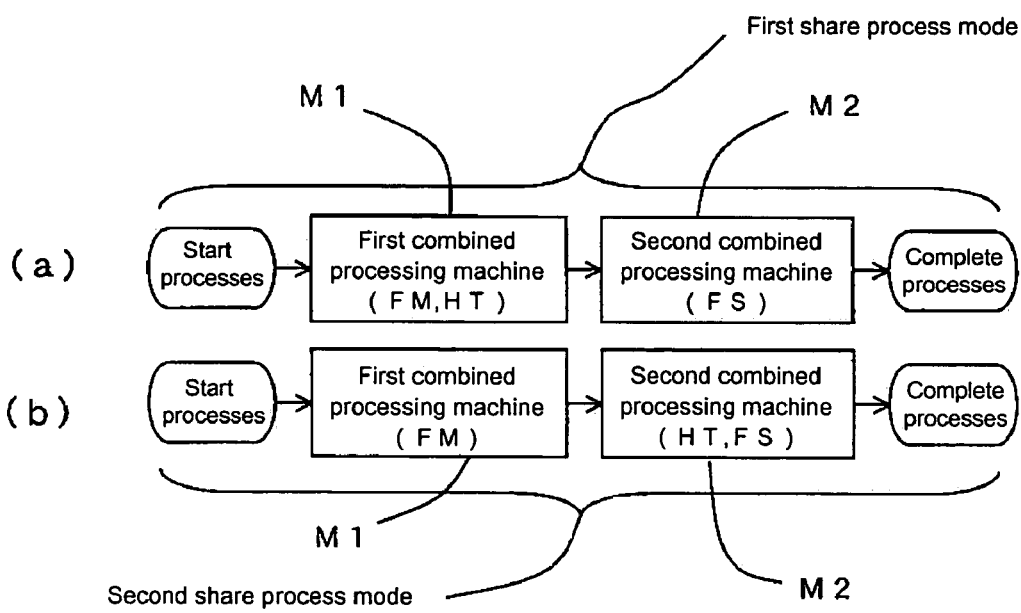
FIG. 15 shows an explanatory drawing of a processing method of a fourth embodiment.

FIGS. 15(a) and 15(b) show fourth embodiment whose processing line includes two combined processing machines M1-M2 sharing the lathing, quenching and grinding processes. FIG. 15(a) is a first share process mode and FIG. 15(b) is a second share process mode. In the first share process mode, the lathing and quenching processes are distributed to the first combined machine M1 and the grinding process is distributed to the second combined processing machine M2. In contrast, the lathing process is distributed to the first combined processing machine M1 and the quenching and grinding processes are distributed to the second combined processing machine M2 in the second share process mode.

Similar to the second embodiment, assuming "n" is the number of the products and VFM, VHT and VFS are the number of the workpieces to be lathed, quenched and ground per unit time respectively, n workpieces are lathed in n/VFM of lathing time, quenched in n/VHT of quenching time and ground in n/VFS of grinding time. In the case that the sum of the lathing time n/VFM and quenching time n/VHT is smaller than the sum of the quenching time n/VHT and the grinding time n/VFS, namely the lathing time n/VFM is smaller than the grinding time N/VFS, the first share process mode (FIG. 15(a)) is set whereby the lathing and quenching processes are distributed to the first combined machine M1 and the grinding process is distributed to the second combined processing machine M2. Or, in the case that the sum of the lathing time n/VFM and the quenching time n/VHT is larger than the sum of the quenching time n/VHT and the grinding time n/VFS, namely the lathing time n/VFM is larger than the grinding time n/VFS, the second share process mode (FIG. 15(b)) is set, whereby the lathing process is distributed to the first combined processing machine M1 and the quenching and grinding processes are distributed to the second combined processing machine M2.

According to the fourth embodiment, the first or second share process mode is set depending on the lathing, quenching and grinding times, the workpieces are processed where the difference of the processing times between the first and second machine M1 and M2 becomes smaller.

Fifth Embodiment

Figure 16:
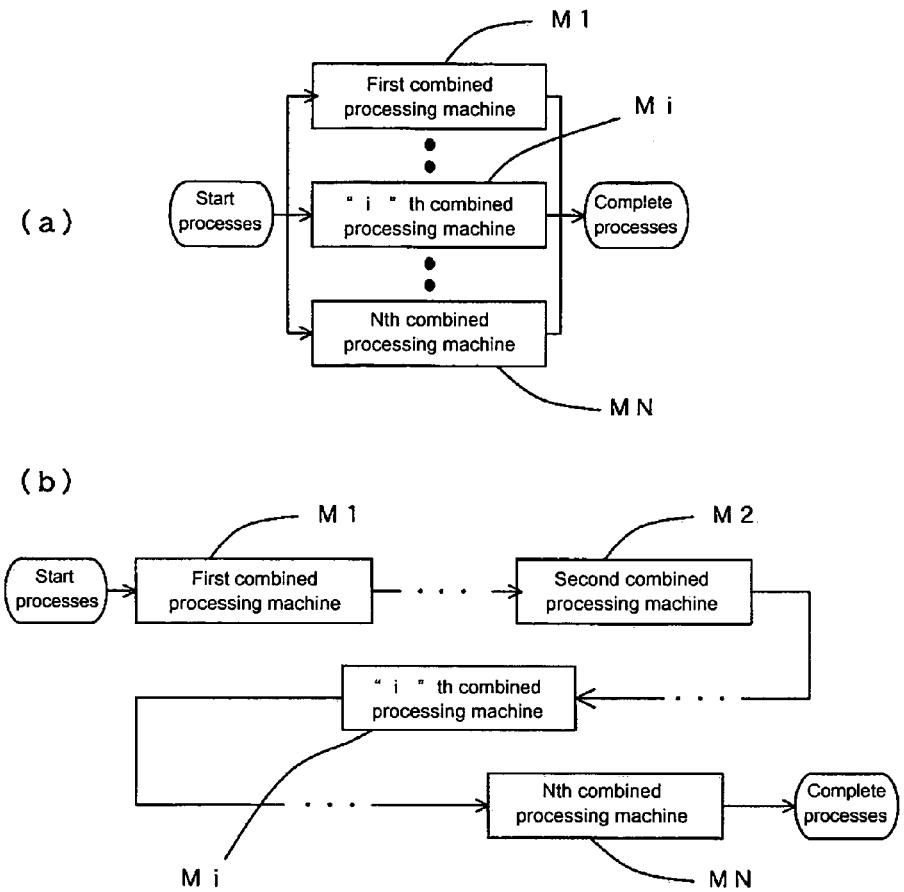
FIGS. 16(*a*)-16(*b*) show explanatory drawings of a processing method of fifth to ninth embodiments.
Figure 17:
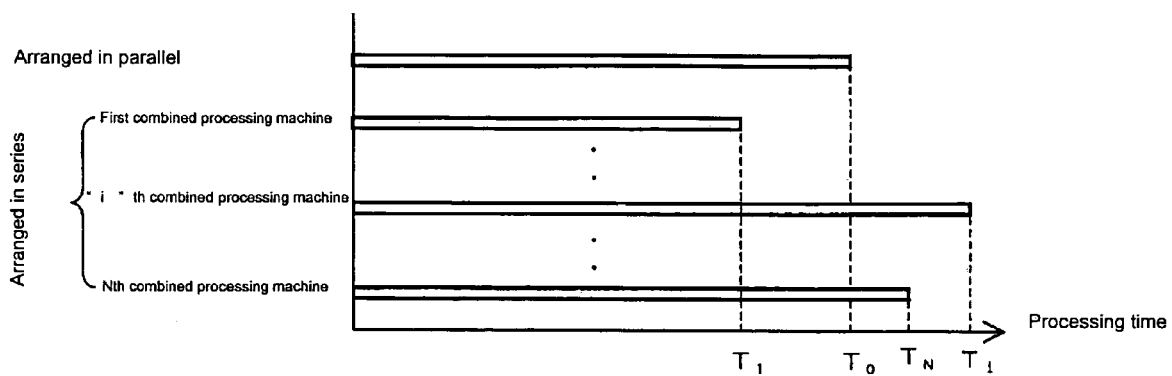
FIG. 17 shows a time chart of a processing method of the fifth to ninth embodiments.

FIGS. 16(a), 16(b) and 17 show a fifth embodiment whose processing line includes N (N is plural) combined processing machines. In the case that the time of the share process of each combined processing machine is longer than a predetermined time, the combined processing machines are arranged in parallel as shown in FIG. 16(a). In contrast, in the case that the time of the share process of each combined processing machine is shorter than the predetermined time, the combined processing machines are arranged in series as shown in FIG. 16(b). Where the plural combined processing machines process the workpieces, the time to complete processing the workpiece equals to the sum of the actual processing times, the tool change times and the workpiece transfer times in the processing line. However the workpiece transfer times are much shorter than the tool change times so that the time to complete processing the workpiece is mainly determined by the actual processing times and the tool change times.

Assuming "n" is the number of the products and VFM, VHT and VFS are the number of the workpieces to be lathed, quenched and ground per unit time respectively, n workpieces are lathed in n/VFM of lathing time, quenched in n/VHT of quenching time and ground in n/VFS of grinding time. In the share process, tk1 is defined as the tool change time(s) of the first combined processing machine M1, tk2 is defined as the tool change time(s) of the second combined processing machine M2 and similarly tki is defined as the tool change time(s) of the "i"th combined processing machine Mi. In contrast, tk is defined as the tool change times where all processes are done by one combined processing machine.

Where N combined processing machines are arranged in parallel, each combined processing machine performs all processes to (n/N) workpieces. The below T0 is defined as the time to complete processing n workpieces W because N combined processing machines process n workpieces in parallel.

$$n/(N \times VFM) + n/(N \times VHT) + n/(N \times VFS) + tk = T0 \quad (6)$$

On the other hand, where N combined processing machines are arranged in series, n workpieces are sequentially transferred among the combined processing machines. On the first combined processing machine M1, nFM1, nHT1 and nFS1 are respectively defined as the number of the lathed, quenched and ground workpieces. Similarly, on the "i"th combined processing machine Mi, nFMi, nHTi and nFSi are respectively defined as the number of the lathed, quenched and ground workpieces. The below T1 is defined as the processing time of the first combined processing machine M1.

$$nFM1/VFM + nHT1/VHT + nFS1/VFS + tk1 = T1 \quad (7)$$

Similarly, the below Ti is defined as the processing time of the "i"th combined processing machine Mi.

$$nFMi/VFN + nHTi/VHT + nFSi/VFS + tki = Ti \quad (8)$$

FIG. 17 is a time chart comparing the processing times T0 by parallel arranged N combined processing machines with the processing times T1, ..., Ti, ... and Tn by series arranged N combined processing machines. Where N combined processing machines are arranged in series so as to sequentially transfer and process the workpieces, the total of the processing times depends on the combined processing machine having the longest processing time. Thus the below expression (9) is defined as the time to complete processing n workpieces which is the largest value among T1, ..., Ti, ... and Tn.

$$\text{Max}\{T1, \ldots, Ti, \ldots, Tn\} \quad (9)$$

In the case that the above expression (9) is larger than T0, namely the total of the processing times by the series arrangement is larger than by the parallel arrangement, N combined processing machines are arranged in parallel. In contrast, in the case that the above expression (9) is smaller than T0, namely the total of the processing times by the series arrangement is smaller than by the parallel arrangement, N combined processing machines are arranged in series.

According to the fifth embodiment, calculated are the totals of the processing times by the series and parallel arrangements so as to determine a preferable arrangement of the combined processing machines to process the workpieces. Therefore integrating the processes is applicable so as to reduce the processing time.

Sixth Embodiment

The sixth embodiment is an example of the fifth embodiment where the number of the combined processing machines is three (N=3) and the largest processing time of the expression (9) is smaller than T0 of the expression (6). The calculation step and the processing step will be described, in the case that the total of the processing times by the series arrangement of three combined processing machines is smaller than by the parallel arrangement of three combined processing machines. Three combined processing machines are arranged in series in order to share the lathing, quenching and grinding processes among the three combined processing machines.

Similar to the second embodiment, three identical combined processing machines are arranged in the processing line, assuming n/VFM is smaller than n/VHT that is smaller than n/VFS (n/VFM<n/VHT<n/VFM). In this case, to the first combined processing machine M1 is distributed the lathing process for all workpieces and the quenching process for a part of the workpieces. To the second combined processing machine M2 is distributed the quenching process for another part of the workpieces and the grinding process for a part of the workpieces. To the third combined processing machine M3 is distributed the grinding process of another part of the workpieces.

Assuming n1 is the number of the quenched workpieces by the first combined processing machine M1, the first combined processing machine M1 lathes n workpieces and quenches n1 workpieces. Further assuming n2 is the number of the ground workpieces by the second combined processing machine M2, the second combined processing machine M2 quenches (n−n1) workpieces and grinds n2 workpieces. The third combined processing machine M3 grinds (n−n2) workpieces. Therefore, the operating time of the first combined processing machine M1 is n/VFM+n1/VHT+tk1, the operating time of the second combined processing machine M2 is (n−n1)/VHT+n2/VFS+tk2, and the operating time of the third combined processing machine M3 is (n−n2)/VFS+tk3. Where the below two equations (10) and (11) are satisfied, the operating times of three machines become equal.

$$n/VFM + n1/VHT + tk1 = (n-n1)/VHT + n2/VFS + tk2 \quad (10)$$

$$n/VFM + n1/VHT + tk1 = (n-n2)/VFS + tk3 \quad (11)$$

Combining equations (10) and (11) gives the number of quenching n1 on the first machine M1 and the number of grinding n2 on the second machine M2.

$$n1 = VHT(n/VFS + n/VHT - 2n/VFM + tk2 - 2tk1 - 2tk3)/3 \quad (12)$$

$$n2 = VFS(2n/VFS - n/VHT - n/VFM + 2tk3 - tk1 - tk2)/3 \quad (13)$$

Therefore, the first combined processing machine M1 is determined to have a share of quenching n1 workpieces so as to help the second combined processing machine M2, and the second combined processing machine M2 is determined to have a share of grinding n2 workpieces so as to help the third combined processing machine M3. According to this result, the first combined processing machine M1 lathes n workpieces and quenches n1 workpieces, the second combined processing machine M2 quenches (n−n1) workpieces and grinds n2 workpieces, and the third combined processing machine M3 grinds (n−n2) workpieces.

According to the sixth embodiment, the lathing, quenching and grinding processes are shared among the combined processing machines so as to reduce the processing time.

Seventh Embodiment

The seventh embodiment is another example of the fifth embodiment. Similar to the sixth embodiment, in the seventh embodiment, the number of the combined processing machines is three (N=3) and the largest processing time of the expression (9) is smaller than T0 of the expression (6). So, three combined processing machines are arranged in series in order to share the lathing, quenching and grinding processes among the three combined processing machines. In the case that the processing times of the lathing, quenching and grinding processes are equal to one another, each combined processing machine performs each process. In this case, no tool change is needed so that no consideration of tool change time is needed.

According to the seventh embodiment, the lathing, quenching and grinding processes are shared among the combined processing machines so as to reduce the processing time.

Eighth Embodiment

The eighth embodiment is a further example of the fifth embodiment. In the eighth embodiment, the number of the combined processing machines is two (N=2) and the largest processing time of the expression (9) is smaller than T0 of the expression (6). So, two combined processing machines are arranged in series in order to share the lathing, quenching and grinding processes among the two combined processing machines.

Similar to the fifth embodiment, n is the number of the products, VFM, VHT and VFS are the number of the workpieces to be lathed, quenched and ground per unit time respectively, tk1 is the tool change time of the first combined processing machine M1, and tk2 is the tool change time of the second combined processing machine M2. Actual processing times to process n workpieces are n/VFM for lathing, n/VHT for quenching and n/VFS for grinding. Thus in the case that the sum of the lathing time n/VFM, the quenching time n/VHT and the tool change time of the first machine tk1 is shorter than the sum of the quenching time n/VHT, the grinding time n/VFS and the tool change time of the second machine tk2, similar to the fourth embodiment, the first share process mode is set where the first combined processing machine M1 performs the lathing and quenching processes and the second combined processing machine M2 performs the grinding process. In contrast, in the case that the sum of the lathing time n/VFM, the quenching time n/VHT and the tool change time of the first machine tk1 is longer than the sum of the quenching time n/VHT, the grinding time n/VFS and the tool change time of the second machine tk2, the second share process mode is set where the first combined processing machine M1 performs the lathing process and the second combined processing machine M2 performs the quenching and grinding processes.

According to the first or second share process mode of the eighth embodiment, the workpieces are processed where the difference of the processing times becomes shorter between the first and second combined processing machines so as to reduce the processing time.

Ninth Embodiment

The ninth embodiment will be described below. Assuming VFM, VHT and VFS are the number of the workpieces to be lathed, quenched and ground per unit time, the processing times to process n workpieces are n/VFM for lathing, n/VHT for quenching and n/FS for grinding. In the share processing, tk1 is defined as the tool change time(s) of the first combined processing machine M1, tk2 is defined as the tool change time(s) of the second combined processing machine M2, similarly tki is defined as the tool change time(s) of the "i"th combined processing machine Mi and tkN is defined as the tool change time(s) of the "N"th combined processing machine MN. And, tw1, tw2, . . . , twi, . . . , twN are defined as the workpiece transferring times to load/unload into/from the machines M1, M2, . . . , Mi, . . . , MN and to hold/release the workpiece W respectively. Further, in the case that all processes are done by one machine, tk is defined as the tool change time(s).

In the case that N combined processing machines are arranged in the processing line in parallel, each machine entirely processes (n/N) workpieces so that the below expression (14) is the processing time T0 of each combined processing machine. N combined processing machines are arranged in parallel so that n workpieces are processed in T0.

$$n/(N \times VFM) + n/(N \times VHT) + n/(N \times VFS) + tk = T0 \qquad (14)$$

On the other hand, in the case that N combined processing machines are arranged in the processing line in series, n workpieces are sequentially transferred among the machines and processed. In this case, on the first combined processing machine M1, nFM1 is defined as the number of the lathings of the workpieces, nHT1 is defined as the number of the quenchings of the workpieces, nFS1 is defined as the number of the grindings of the workpieces. Similarly, on the "i"th combined processing machine Mi, nFMi, nHTi, nFSi are respectively defined as the number of the lathing, quenching and grinding operations of the workpieces. The below expressions (15) and (16) are the processing times T1 and Ti of the first and "i"th combined processing machines M1 and Mi respectively.

$$nFM1/VFM + nHT1/VHT + nFS1/VFS + tk1 + tw1 = T1 \qquad (15)$$

$$nFMi/VFM + nHTi/VHT + nFSi/VFS + tki + twi = Ti \qquad (16)$$

Where N combined processing machines are arranged in series so as to sequentially transfer and process the workpieces, the total of the processing times depends on the combined processing machine having the longest processing time. Thus the below expression (17) is defined as the time to complete processing n workpieces, which is the largest value among T1, . . . , Ti, . . . and Tn.

$$\text{Max}\{T1, \ldots, Ti, \ldots TN\} \qquad (17)$$

A process mode setting step sets a first or second process mode. The first process mode is a mode where each of N combined processing machines sequentially performs all processes to (n/N) workpieces simultaneously. The second process mode is a mode to sequentially transfer and process n workpieces among N combined processing machines in series according to the selected share processing.

A calculation step calculates the processing time of the first process mode T0 of the expression (14) and the processing time of the second process mode Max$\{T1, \ldots, Ti, \ldots, TN\}$ of the expression (17). Comparing both processing times, the calculation step selects one of the modes whose processing time is shorter to process the workpieces. In the case that the processing time of the first process mode T0 is shorter, N combined processing machines are arranged in parallel by the arrangement step and each of N combined processing machines performs all processes to (n/N) workpieces. On the other hand, in the case that the processing time of the second process mode Max$\{T1, \ldots, Ti, \ldots, TN\}$ is shorter, N combined processing machines are arranged in series by the arrangement step and n workpieces are sequentially transferred and processed among N combined processing machines by the share processing step.

According to the ninth embodiment, in consideration of processing times of plural kinds of the processes, tool change times and workpiece change times, the mode with the shorter processing time is selected between the first and second process modes so as to increase productivity.

EFFECTS OF THE EMBODIMENTS

According to the embodiments of the present invention, the below effects are provided.

(i) The number of the combined processing machines and the arrangement of the processing line are determined depending on the volume of the products so as to provide a preferable processing method according to the arranged machines. Therefore the workpieces are effectively processed from the beginning to the end and from small to large volume of products.

(ii) Each combined processing machine has just tool(s) applied to the process(es) where the machine performs, thereby it is effective for the tool cost, the maintenance and etc.

(iii) Where a floor space is limited, a preferable production system has the number of the combined processing machines suitable to the floor space, the arrangement of the combined processing machines, the processing method suitable to the arrangement and etc. Therefore the effective production system is provided.

Obviously, numerous modifications and variations of the present invention are possible in light of the above teachings. It is thereby to be understood that within the scope of the appended claims, the present invention may be practiced otherwise than as specifically described herein.

What is claimed is:

1. A processing method of n number of workpieces of a single kind in S seconds using at least one combined processing machine which selectively uses a forming tool, a heat treatment tool and a finishing tool to perform various processes to the workpieces in a predetermined sequence, wherein S/n is a tact time, the method comprising:

a step of determining a required number of combined processing machines as the closest integer larger than the ratio of the sum of processing times of the processes for a single workpiece to the tact time;

in a case that the required number of combined processing machines is determined to be greater than one, an arrangement step to arrange the plural combined processing machines in a processing line according to a volume of the workpieces, operating time of the combined processing machines and the tact time, wherein the plural combined processing machines are arranged serially;

in the case that the required number of combined processing machines is determined to be greater than one, a step of sequentially transferring all of said workpieces to all of said plural combined processing machines from a first one of said plural combined processing machines to a last one of said plural combined processing machines, to process each one of the workpieces during said sum of processing times;

in the case that the required number of combined processing machines is determined to be greater than one, a process share determination step to determine that at least a first one of said plural combined processing machines performs processing on each one of said workpieces for a time which is substantially equal to, but not greater than, the tact time; and in the case that the required number of combined processing machines is determined to be greater than one, a share process step to share the processes according to the determination of the process share determination step.

2. The processing method of the workpieces according to claim 1, wherein the arrangement step arranges three combined processing machines in the processing line; and wherein the share process step distributes a lathing process to a first combined processing machine, a quenching process to a second combined processing machine and a grinding process to a third combined processing machine.

3. A processing method of workpieces using plural combined processing machines, each of which selectively uses a forming tool, a heat treatment tool and a finishing tool to perform various processes to the workpieces in a predetermined sequence, comprising:

an arrangement step to arrange the plural combined processing machines in a processing line according to a volume of products of the workpieces, operating time of the combined processing machines and a tact time to complete processing one of the workpieces;

a process share determination step to determine if each combined processing machine will share one or more processes according to the volume of the products, the operating time and the tact time; and a share process step to share the processes according to the determination of the process share determination step and to transfer the workpieces among the combined processing machines, wherein the arrangement step arranges two combined processing machines in the processing line;

wherein the share process step defines a first share process mode to distribute a lathing process and a quenching process to the first combined processing machine and second share process mode to distribute a quenching process and a grinding process to the second combined processing machine; and wherein the share process step executes the first or second share process mode according to processing times of the lathing, quenching and grinding processes.

* * * * *